(12) United States Patent
Sinclaire

(10) Patent No.: US 9,279,407 B2
(45) Date of Patent: Mar. 8, 2016

(54) SYSTEM AND METHOD FOR GENERATING ELECTRICAL POWER FROM A FLOWING CURRENT OF FLUID

(75) Inventor: Ross Sinclaire, Calgary (CA)

(73) Assignee: JUPITER HYDRO INC., Calgary (CA)

( * ) Notice: Subject to any disclaimer, the term of this patent is extended or adjusted under 35 U.S.C. 154(b) by 0 days.

(21) Appl. No.: 13/816,009

(22) PCT Filed: Aug. 11, 2011

(86) PCT No.: PCT/CA2011/050492
§ 371 (c)(1),
(2), (4) Date: Feb. 8, 2013

(87) PCT Pub. No.: WO2012/019307
PCT Pub. Date: Feb. 16, 2012

(65) Prior Publication Data
US 2013/0134715 A1 May 30, 2013

Related U.S. Application Data

(60) Provisional application No. 61/372,775, filed on Aug. 11, 2010, provisional application No. 61/385,362, filed on Sep. 22, 2010.

(51) Int. Cl.
*F03B 13/00* (2006.01)
*H02P 9/04* (2006.01)
(Continued)

(52) U.S. Cl.
CPC . *F03B 13/10* (2013.01); *E02B 9/08* (2013.01); *F03B 13/264* (2013.01);
(Continued)

(58) Field of Classification Search
CPC ......... Y02E 10/28; Y02E 10/20; Y02E 10/72; F05B 2250/25; F05B 2240/97; F05B 2240/93; F05B 2240/12; F05B 2240/211; F05B 2240/221; F05B 2210/16; F05B 2210/404; F03B 17/061; B63B 21/50
USPC .............. 290/43, 44, 54, 55; 60/398; 415/3.1; 416/85
See application file for complete search history.

(56) References Cited

U.S. PATENT DOCUMENTS

| 953,891 | A | * | 4/1910 | Atkins | ............................ 416/11 |
| 1,025,929 | A | * | 5/1912 | Snook | ............................... 416/6 |

(Continued)

FOREIGN PATENT DOCUMENTS

| EP | 2003332 A1 | * | 12/2008 |
| GB | 108632 A | * | 8/1917 |

(Continued)

OTHER PUBLICATIONS

English Translation and Original Office Action for corresponding Japanese Patent Application 2013-523448.

*Primary Examiner* — Tulsidas C Patel
*Assistant Examiner* — Charles Reid, Jr.
(74) *Attorney, Agent, or Firm* — Goodwin Law; Sean W Goodwin

(57) ABSTRACT

A helical turbine is operatively connected to at least one generator system for generating electrical power. System performance is optimized by controlling the operative angle between the longitudinal axis of the turbine and the direction of the current flow and by controlling a pitch ratio of the turbine. A pair of turbines, arranged in V-shape, each at the operative angle from a neutral centerline, provides symmetry and counteracts reactive torque. For wind operations, the V-shape is freely rotatable into the wind. For bi-directional tidal operations, the V-shape is part of a buoyant structure, positioned in the current and anchored to the floor. The structure is fit with control surfaces to ensure the system orientation. In unidirectional currents, one or more turbines can be angled downwardly into the current at the operative angle, elevators ensuring the angle is maintained.

23 Claims, 19 Drawing Sheets

(51) Int. Cl.
  *F03B 13/10* (2006.01)
  *F03B 13/12* (2006.01)
  *E02B 9/08* (2006.01)
  *F03B 13/26* (2006.01)
  *F03B 17/06* (2006.01)

(52) U.S. Cl.
  CPC ......... *F03B 17/061* (2013.01); *F05B 2210/16* (2013.01); *F05B 2240/243* (2013.01); *F05B 2240/40* (2013.01); *F05B 2240/97* (2013.01); *F05B 2250/25* (2013.01); *Y02E 10/28* (2013.01); *Y02E 10/38* (2013.01); *Y02E 10/721* (2013.01)

(56) References Cited

U.S. PATENT DOCUMENTS

| | | | | |
|---|---|---|---|---|
| 1,729,362 A | * | 9/1929 | Ruthven | 416/13 |
| 1,745,356 A | * | 2/1930 | Crofton | 416/86 |
| 3,187,816 A | * | 6/1965 | Winter | 416/85 |
| 4,317,330 A | * | 3/1982 | Brankovics | 60/398 |
| 4,412,417 A | * | 11/1983 | Dementhon | 60/497 |
| 4,500,529 A | * | 2/1985 | Shanklin et al. | 514/237.8 |
| 6,856,036 B2 | * | 2/2005 | Belinsky | 290/42 |
| 2004/0139899 A1 | * | 7/2004 | Scott | 114/125 |
| 2007/0231072 A1 | * | 10/2007 | Jennings et al. | 405/75 |
| 2008/0211233 A1 | * | 9/2008 | Farrelly | 290/54 |
| 2008/0231057 A1 | * | 9/2008 | Zeuner | 290/54 |
| 2009/0001724 A1 | * | 1/2009 | Lee et al. | 290/44 |
| 2009/0022597 A1 | * | 1/2009 | Bowie | 416/223 R |
| 2009/0220369 A1 | * | 9/2009 | Wiedenhoefer et al. | 418/48 |
| 2010/0123315 A1 | * | 5/2010 | Anderson, Jr. | 290/53 |
| 2010/0253083 A1 | * | 10/2010 | Schlabach et al. | 290/54 |
| 2010/0266406 A1 | * | 10/2010 | Eielsen | 416/84 |
| 2011/0081243 A1 | * | 4/2011 | Sullivan | 416/120 |

FOREIGN PATENT DOCUMENTS

| | | | |
|---|---|---|---|
| GB | 2441821 A | * | 3/2008 |
| JP | S57-195875 | | 12/1982 |
| JP | S63-57874 | | 3/1988 |

* cited by examiner

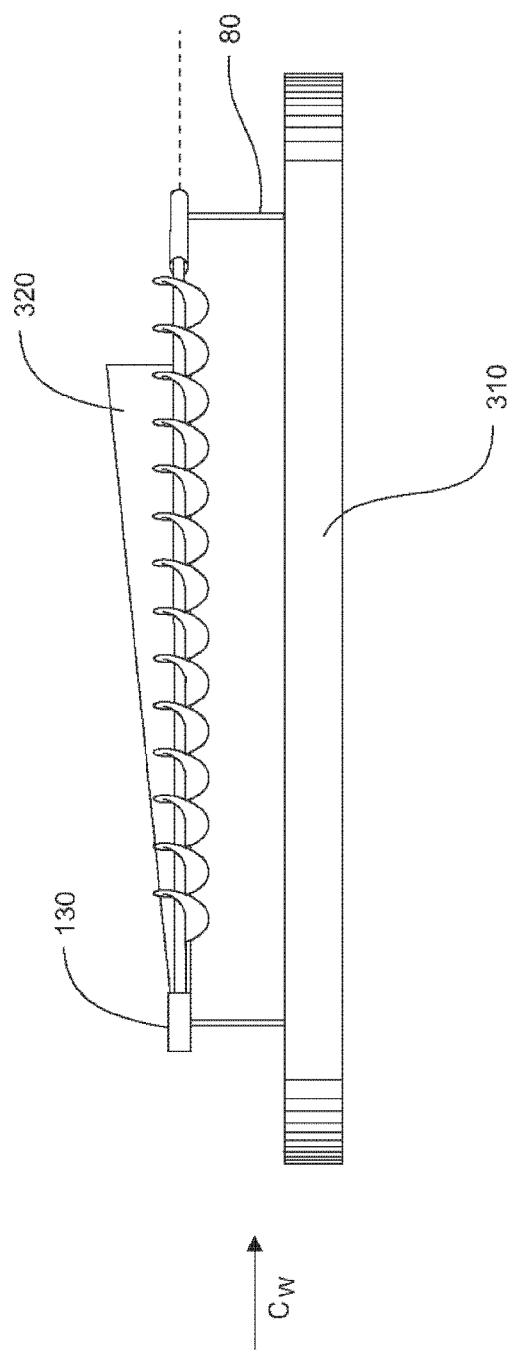

SYSTEM AND METHOD FOR GENERATING ELECTRICAL POWER FROM A FLOWING CURRENT OF FLUID

FIELD OF THE INVENTION

Embodiments of the invention relate to the generation of electrical power from a fluid having a current flowing in a direction. More particularly, embodiments of the invention relate to a system having a helical turbine positioned in the flowing current and oriented at an angle relative to the direction of the flowing current.

BACKGROUND OF THE INVENTION

Generating electrical power from mechanical energy is a type of alternate energy that is commonly found in locations where electrical energy can be generated from currents of flowing fluids, such as water or air. Examples include the generation of electricity by hydro-electric dams and wind turbines.

Typically, a system for generating electricity from flowing fluids has a turbine that is operatively connected to a generator by a rotatable shaft or flexible cable. The turbine is often placed within the current of the flowing fluid, such as water or wind and as the current flows or passes by the turbine, the turbine is caused to rotate. The rotational movement of the turbine is mechanically transferred to the generator through the rotatable shaft or flexible cable where the mechanical energy can be converted into electrical energy.

Electrical energy generated can then be transferred to a commercial power grid, can be transferred directly to electrically powered equipment or can be stored in batteries for future use.

It is known to have multiple turbines operatively connected to a single generator or have multiple turbines each operatively connected to its own generator for generating electrical power.

Hydro-electric generators typically have a submerged or semi-submerged turbine, such as a propeller, that is placed within a flowing body of water and are usually oriented to be directly in line with the direction of flow of the water or current. That is, a rotational axis of the turbine is substantially parallel and in-line with the direction of flow of the current.

Rotors having helical surfaces are known for generating power from the flow of water. U.S. Pat. No. 1,371,836 to Antz discloses a rotor positioned within a stream to assume an oblique position with relation to the direction of flow. The rotor has a plurality of vanes or blades spaced apart from one another along a shaft, providing a plurality of passages between each of them for permitting water to flow around the rotatable shaft. International Published Patent Application WO 2004/067957 A1 to Eielsen (Eielsen '957) discloses a screw turbine device having a single start helical blade rotatable about a central axis. Eielsen '957 teaches that an angle between the direction of the flow of the current relative to the central axis (or axis of rotation of the turbine) must be approximately equal to that of the pitch angle, being the angle of the outer edge of the helical blade relative to the central axis.

International Published Patent Application WO 2006/059094 A1 to Bowie discloses an apparatus for generating power from a flowing fluid, such as from water or wind. Bowie's apparatus has one or more helical blade sections held in position within a current by cables or other anchoring means and oriented such that an angle between the axis of rotation of the helical blade and the direction of the flow of the fluid is preferably kept less than 30 degrees. International Published Patent Application WO 2009/093909 A1 to Eielsen (Eielsen '909) teaches the turbine screw device of Eielsen '957, except for having two helical screws adjacent one another for improved utilization of the flowing water.

Similarly, windmills typically have a turbine which rotates about a longitudinal axis (or axis of rotation) in response to a wind blowing or passing thereby. The rotational movement of the turbine is mechanically transferred to a generator by a rotatable shaft for producing electrical energy. Certain prior art windmills have a nacelle housing a rotor, rotatable shaft, and generator therein. Other prior art windmills have an extended rotatable shaft that operatively connects the turbine with a generator that is spaced away therefrom.

Typically, windmills are classified according to the orientation of turbine's axis of rotation. A windmill having a horizontal axis of rotation is more commonly known as a HAWT (horizontal axis wind turbine) while a windmill having a vertical axis of rotation is known as VAWT (vertical axis wind turbine). HAWT's are typically characterized by the axis of rotation or longitudinal axis being oriented to be parallel or in line with the direction of the wind while VAWT's are typically characterized by the longitudinal axis of the turbine being oriented to be perpendicular to the direction of the wind.

VAWT's can further be classified into two main categories: 1) the Darrieus type windmill (more commonly known as egg-beater turbines) which consists of a central vertical tower having two or more curved rotor blades; and 2) the Savonius type windmill, which are drag type wind turbines having two or more scoops, such as those used in anemometers, radially extending from a central vertical tower. A giromill is a sub-type of the Darrieus windmill having straight planar rotor blades instead of curved blades, and the twisted Savonius windmill is a modified Savonius windmill having long helical scoops instead of smaller scoops.

GB Patent Application GB 2,057,584 to Burgdorf discloses a variation of the twisted Savonius windmill, having at least one double start helical turbine. Burgdorf teaches that it is important that the axis of rotation of the helical turbine is angled to the wind by 45° and that the pitch angle is of about 45°. Burgdorf teaches that the direction of the flow of the current relative to the central axis must be approximately equal to that of the pitch angle, as taught by Eielsen '957. However, Burgdorf specifically teaches that the angle is 45°

It appears that there is still room for higher efficiency utilization of rotor turbines and a need for a system capable of use in tidal, wind and uni-directional flow environments.

SUMMARY OF THE INVENTION

Generally, a system is provided for generating electrical energy from a current and can have at least one helical turbine operatively, oriented at an operational angle to the current and connected to a generator, such as by a rotatable shaft or flexible cable. The helical turbine is placed within the flowing current, the resulting rotational movement being mechanically transferred to the generator for converting the fluid energy into electrical energy.

In an embodiment of a tidal system, a buoyant structure, having one or more helical turbines secured at the operative angle, is aligned in the current. A pair of turbines, arranged in a substantially horizontal plane and in a V-shape, each at the operative angle from a neutral centerline, provides symmetry and counteracts reactive torque. Control surfaces, such as a keel, elevators and ailerons maintain the structure in about a horizontal plane. Anchors extending from the keel maintain the structure in place without adversely affecting the positioning within the horizontal plane. In other embodiments, the anchors can be used to raise and lower the structure. Anchor lines, such as cables, can extend between the anchor device on the floor of the body of water, through guides along the keel, to winches atop the structure. Dispensing of anchor line enables raising of the system to surface, and rewinding the anchor line draws the buoyant structure down into the current. Multiple systems, each having pairs of turbines, can be arranged in a farm or array, anchor points on the floor being shared where possible.

In an embodiment of a substantially uni-directional ocean current environment, a pair of turbines can depend downwardly from generators supported on a floating platform or barge. A pair of turbines is supported side-by-side in a structure, including control surfaces such as elevators. As the current varies, the elevators counteract the turbines movement for maintaining the turbine at the operational angle.

In a wind embodiment, buoyancy and anchoring are not factors, while variable direction of the wind is a greater factor. The structure supporting the turbines is rotatable, and can be freely rotatable to orient the turbines at the operational angle. In an embodiment having a pair of helical turbines arranged in a V-shape on a freely rotating base, the shape inherently orients the turbines at the operational angle. The reaction of changes in wind direction may be aided using a rudder or wind vane.

The electrical energy produced by the generator can then be transferred or connected to a commercially available electrical grid or storage facilities by typical transmission lines.

In a broad aspect of the invention, a system is provided for generating electrical power from a body of fluid having a current flowing in a direction comprising at least one helical turbine rotatable about a longitudinal axis. At least one generator is operatively connected to the at least one helical turbine for converting rotation of the turbine into electrical power. A structure supports the at least one helical turbine for maintaining an operative angle between the longitudinal axis and the direction of the current. In an embodiment the structure includes a pair of turbines arranged in a V-shape converging at the generators.

In a wind embodiment, the V-shape arrangement is freely rotatable on a base for orienting into the current of the wind. In a tidal arrangement in a body of water, the structure is substantially horizontal and the V-shape includes stabilizing members connecting the turbines and supporting control surfaces including a keel along the direction of the current. Elevators and ailerons maintain the structure in the horizontal plane. In an embodiment for a uni-directional current in a body of water, two or more substantially parallel turbines are supported on a floating platform and connect at generators at the platform. The turbines extend into the current at the operative angle. Control surfaces dispose along the turbines maintain the system at the operative angle.

In another broad aspect, a system is provided for generating electrical power from a body of fluid having a current flowing in a direction comprising at least one helical turbine rotatable about a longitudinal axis. At least one generator is operatively connected to the at least one helical turbine for converting rotation of the turbine into electrical power. A structure supports the at least one helical turbine at maintaining an optimized and operative angle between the longitudinal axis and the direction of the current of about 29° to about 32°. Further, the turbine have a blade extending along a length thereof and have an optimized pitch ratio in the range of about 0.5 to about 0.75.

BRIEF DESCRIPTION OF THE FIGURES

FIG. 11 is side schematic representation of the embodiment in accordance with FIG. 10, illustrating supports for positioning the helical turbines and at least one generator above the rotatable base and within a wind current;

DESCRIPTION OF EMBODIMENTS OF THE INVENTION

A system is disclosed for generating electrical power or electricity using one or more helical rotors or turbines subject to currents in a body of fluid such as water or the air. Rotation of the turbine converts the kinetic energy of the flowing fluid into electrical power or electricity. In an embodiment, the system can comprise a turbine operatively connected to a generator, such as direct connection, shaft or flexible cable. The turbine is placed within the flowing current and caused to rotate by the fluid flowing thereby.

Figure 1:
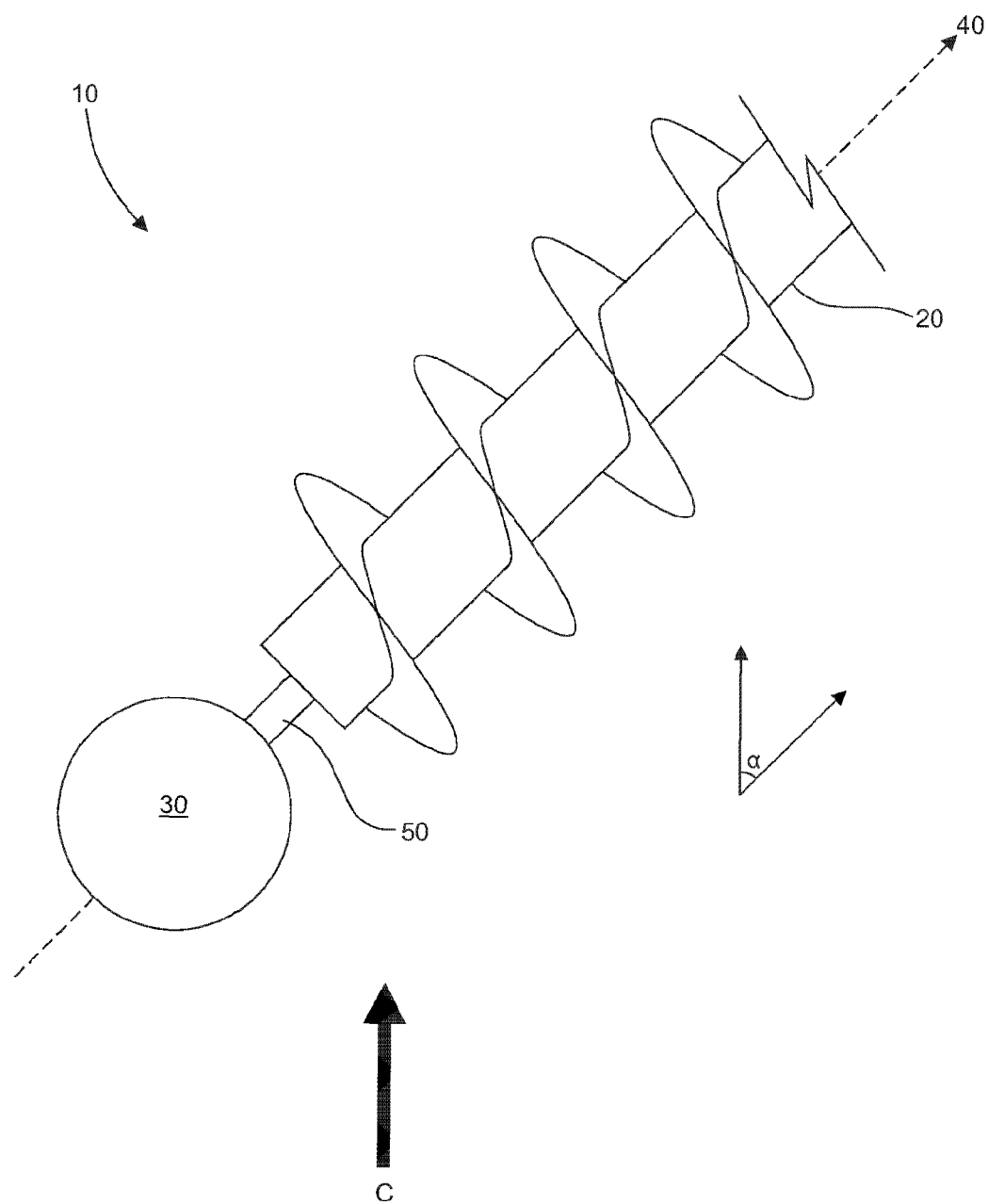
FIG. 1 is a schematic representation of an embodiment of the present invention, illustrating a single start helical rotor operatively connected to a generator by a rotatable shaft, the helical rotor being angularly oriented relative to a direction of flowing fluid.

As illustrated schematically in FIG. 1, an embodiment of a turbine system 10 is provided for generating electrical energy or power from a flowing current C, such as water or air. The system 10 comprises at least one helical turbine 20, such as a screw or auger, placed or positioned within the current C and operatively connected to a generator 30. The turbine 20 is positioned such that an axis of rotation or longitudinal axis 40 of the turbine 20 is oriented to be angularly offset or non-parallel to a direction of the flowing current C. That is, an operative angle α between the direction of the flowing current C and the longitudinal axis 40 of the helical turbine 20 is between the range of 0 and 90 degrees (i.e. 0<α<90).

The flow of the current passing by the turbine 20 causes rotational movement of the helical turbine 20. In an embodiment, the rotational movement of the helical turbine 20 can be mechanically transferred to the generator 30, such as through a flexible cable or rotatable shaft 50.

Applicant believes that successful, optimal performance of a helical turbine is dependent on factors including the available surface area for exposure to a current passing thereby, the operative angle and a pitch ratio.

Elements related to available surface area for exposure can include the length of the turbine, the outer diameter of the turbine, the inner diameter of the turbine, the pitch of the helicoid blade, and the number of turns or twists of the helicoid blade.

Applicant believes that increasing amounts of surface area of the turbine exposed to the current C, effects the force acting thereon for rotating the helical turbine about its longitudinal axis. The amount of surface area can be varied by varying a pitch of the turbine.

Figure 2A:
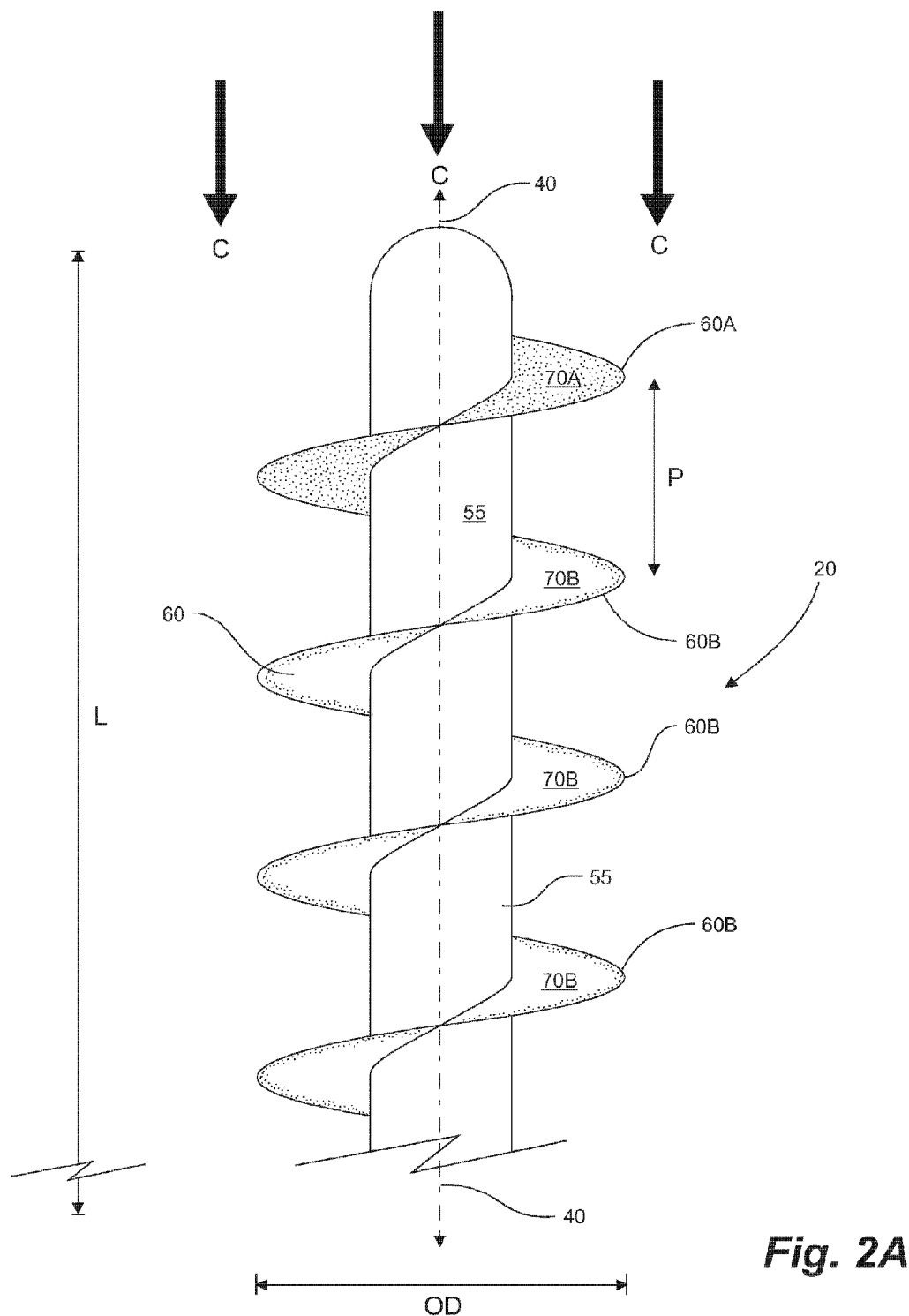
FIG. 2A is a schematic representation of a helical turbine having it axis of rotation directly in line with and parallel to the direction of a flowing current and where on the helical turbine water imparts energy to turn the turbine.
Figure 2B:
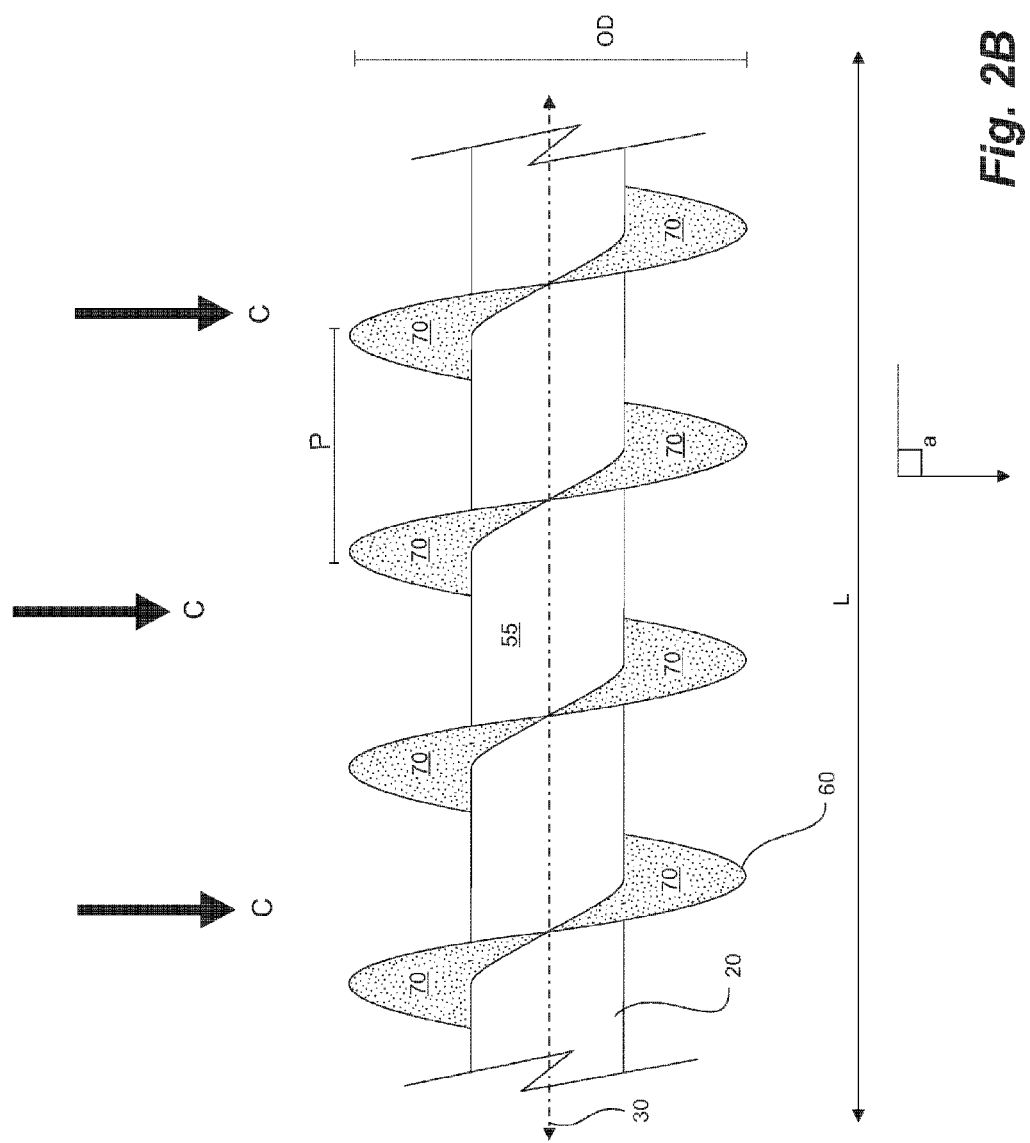
FIG. 2B is a schematic representation of a helical turbine having its axis of rotation perpendicular to the direction of a flowing current and where on the helical turbine water imparts energy to turn the turbine.
Figure 2C:
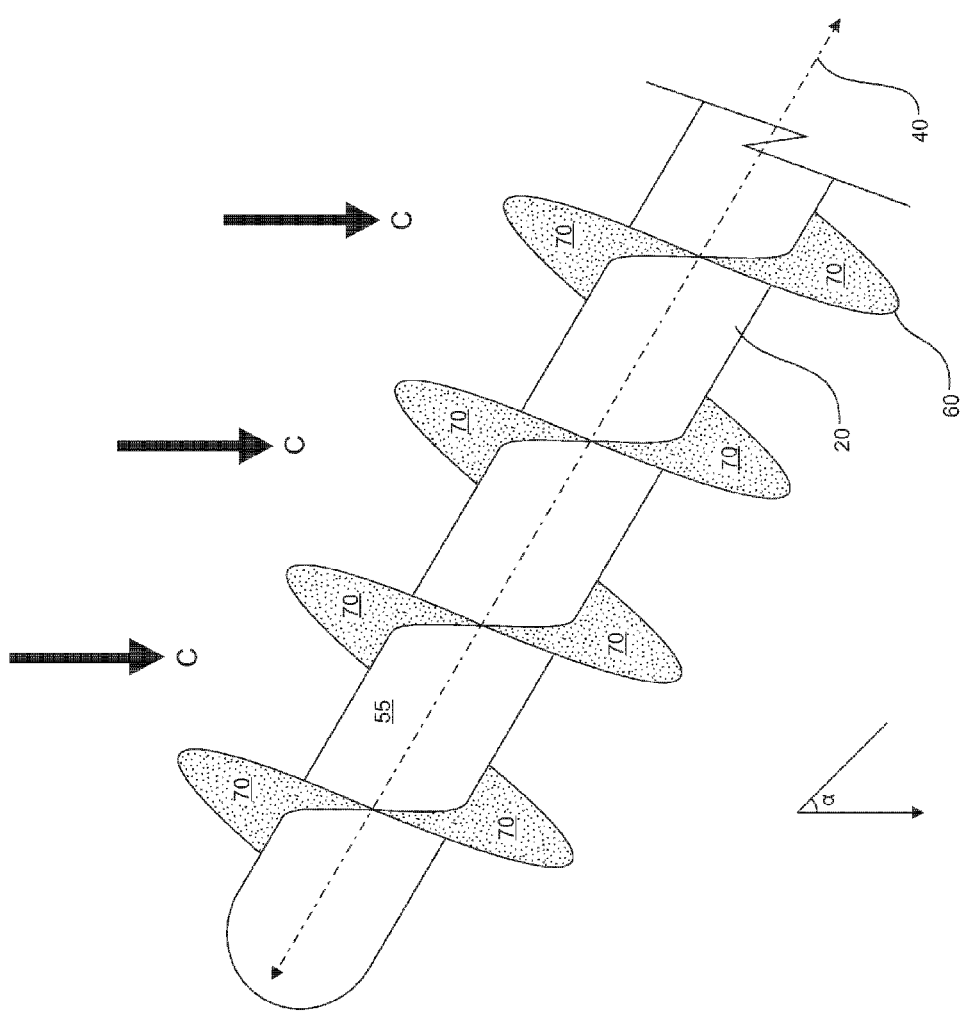
FIG. 2C is a schematic representation of an embodiment of the present invention, illustrating a helical turbine that is angularly oriented relative to the direction of a flowing current and where on the helical turbine water imparts energy to turn the turbine.

With reference to FIGS. 2A to 2C, the helical turbine 20 can comprise a shaft 55 of a length L having at least one helicoid blade 60 extending along the entire length of the shaft 55. The at least one helicoid blade 60 defines an outer diameter OD and a pitch P, the length of one full twist or turn of the helicoid blade 60. Each twist or turn of the helicoid blade 60 presents a surface area 70 for exposure to the current C. The relationship between the pitch ratio PR and the outer diameter OD can be defined as a pitch ratio PR, such that PR=P/OD.

Non-optimal arrangements of helical turbines are shown in FIGS. 2A and 2B. In FIG. 2A, a helical turbine 20 having its longitudinal axis 40 positioned to be in line with and/or substantially parallel with the direction of the current C, results in a leading twist 60A of the helicoid blade 60 having the greatest surface area 70A exposed to the current C, while subsequent turns 60B,60B of subsequent twists have a lesser extent of their surface area 70B,70B exposed. Accordingly, a total maximum amount of available surface of the helicoid blade 60 is not being fully utilized to rotate the turbine 20. In FIG. 2B, a helical turbine 20 with its longitudinal axis 40 substantially perpendicular to the direction of the current C causes the current C to flow or pass by the turbine 60 on either thereof, with cancelling forces resulting providing little impetus on the helical turbine 20 to rotate about its longitudinal axis 40.

As illustrated in FIG. 2C, Applicant believes that the highest rate of rotation of the helical turbine 20 can be generated with optimal amounts of surface area 70 of the helicoid blade 60 exposed to the current C. This can be achieved when the turbine 20 is oriented to be angularly offset relative to the direction of the current C. That is, when the angle α between the longitudinal axis 40 and the direction of the current C is greater than about zero degrees, but less than about 90 degrees, the amount of surface area 70 is exposed to the current C is greater than as opposed to when the angle between the longitudinal axis 40 and the direction of the current C is either about zero degrees or 90 degrees.

For example, Applicant conducted several tests using several different helical turbines. Each helical turbine had substantial the same length L (of about 6 feet (1.8 m)) and substantially the same outer diameter OD (of about 9 inches (22.9 cm)), and only differed in the pitch P. The first helical turbine had a pitch of about 3 inches (8 cm) for a corresponding a pitch ratio of about 0.33. The second turbine had a pitch of about 4¼ inches (11 cm) and a corresponding pitch ratio of about 0.47. The third turbine had a pitch of about 5½ inches (14 cm) and a pitch ratio of about 0.61. The fourth helical turbine had a pitch of about 6¾ inches (17 cm) and a pitch ratio of about 0.75. The fifth and last helical turbine had a pitch of about 8 inches (20.5 cm) for a pitch ratio of about 0.89.

Each helical turbine was operatively connected to a means for measuring the rate of rotation thereof, such as the DT 6234B RPM tachometer (available from Hanada, Conn.) and was placed in a concrete irrigation canal having a current of water and a sufficient depth of about 18 inches (46 cm) deep flowing therethrough. Each helical turbine was positioned in the flowing current and oriented such that the angle α between the longitudinal axis 40 and the direction of the current was greater than zero degrees but less than 90 degrees. The rates of rotation (in rotations per minute or rpm) of each of the helical turbines, at differing angles, were recorded and are presented in Table 1 and FIGS. 13A to 13E below. The flow rate of the current flowing through the irrigation canal remained substantially constant throughout the testing.

TABLE 1

RATE OF ROTATION (in rpm)

| PITCH (inches) | PITCH RATIO | ANGULAR ORIENTATION RELATIVE TO CURRENT DIRECTION | | | | | | | | |
|---|---|---|---|---|---|---|---|---|---|---|
| | | 27° | 28° | 29° | 30° | 31° | 32° | 33° | 34° | 35° | 36° |
| 3 | 0.33 | 123 | 124 | 124 | 125 | 125 | 125 | 125 | 125 | 125 | 124 |
| 4.25 | 0.47 | 141 | 142 | 142 | 143 | 143 | 143 | 142 | 141 | 140 | 139 |
| 5.5 | 0.61 | 154 | 156 | 158 | 158 | 159 | 158 | 156 | 155 | 154 | 153 |
| 6.75 | 0.75 | 146 | 148 | 149 | 150 | 151 | 150 | 149 | 148 | 147 | 145 |
| 8 | 0.89 | 131 | 133 | 135 | 134 | 132 | 132 | 131 | 131 | 131 | 130 |

| PITCH (inches) | PITCH RATIO | ANGULAR ORIENTATION RELATIVE TO CURRENT DIRECTION | | | | | | | | |
|---|---|---|---|---|---|---|---|---|---|---|
| | | 37° | 38° | 39° | 40° | 41° | 42° | 43° | 44° | 45° |
| 3 | 0.33 | 124 | 124 | 124 | 123 | 123 | 123 | 123 | 123 | 123 |
| 4.25 | 0.47 | 138 | 137 | 136 | 135 | 134 | 133 | 132 | 131 | 130 |
| 5.5 | 0.61 | 152 | 151 | 150 | 149 | 148 | 147 | 146 | 145 | 144 |
| 6.75 | 0.75 | 144 | 143 | 142 | 141 | 140 | 139 | 138 | 136 | 135 |
| 8 | 0.89 | 130 | 130 | 129 | 129 | 129 | 129 | 128 | 128 | 128 |

Figure 13A:
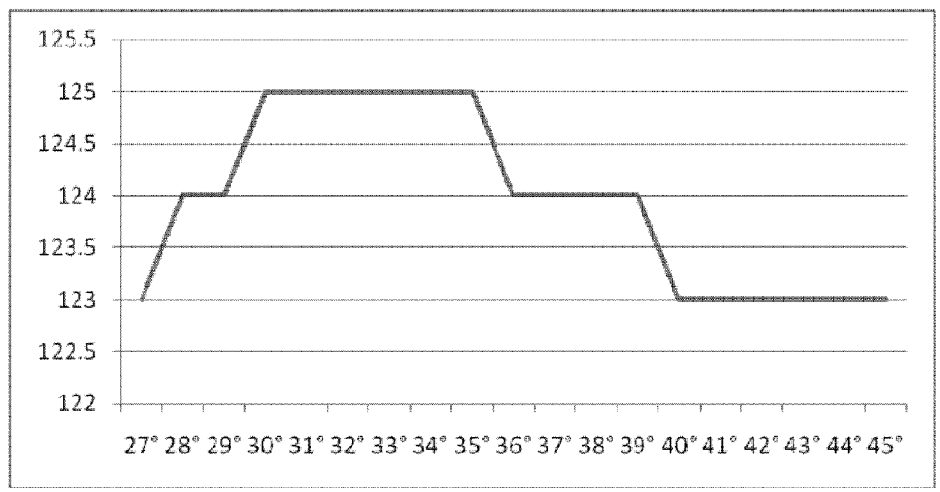
FIGS. 13A through 13E are charts illustrating test results for rates of rotation versus operative angle for 9 inch (23 cm) diameter turbines having pitches of 3, 4.25, 5.5, 6.75 and 8 inches (8, 11, 14, 17 and 20.5 cm) respectively.

As shown in FIG. 13A and with reference to Table 1, for a helical screw of 6 feet (1.8 m) in length, having an outer diameter of about 9 inches (23 cm) and a pitch of about 3 inches (8 cm) (PR 0.33), the highest rate of rotation of the turbine was observed to be about 125 rpm. This sub-optimal rate of rotation occurred when the angle α between the longitudinal axis 40 and the direction of the current C was between the range of about 30° and about 35°.

Figure 13B:
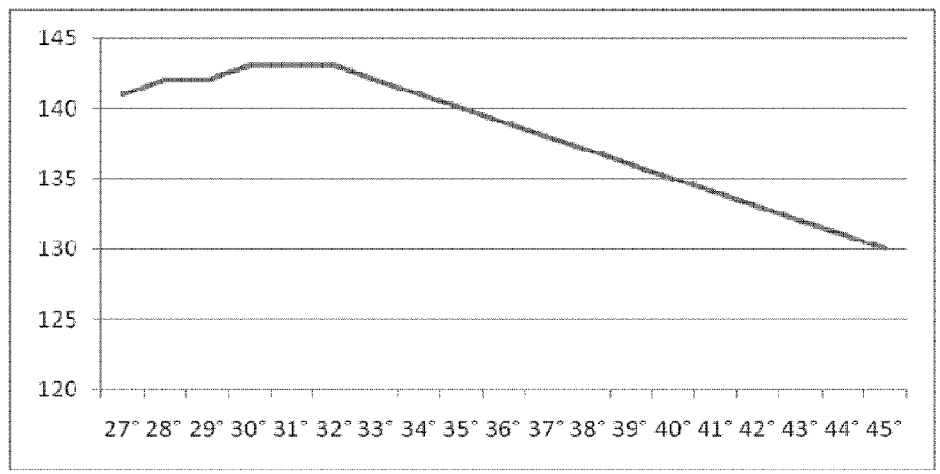

As shown in FIG. 13B and with reference to Table 1, for a helical screw of 6 feet (1.8 m) in length, having an outer diameter of about 9 inches (23 cm) and a pitch of about 4¼ inches (11 cm) (PR 0.47), the highest rate of rotation of the turbine was observed to be about 143 rpm which occurred when the angle α between the longitudinal axis 40 and the direction of the current C was between the range of about 30° and about 32°.

Figure 13C:
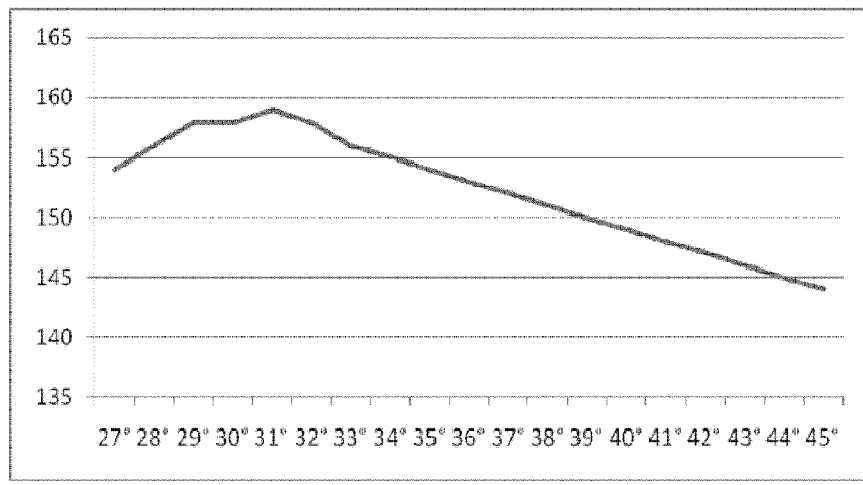

As shown in FIG. 13C and with reference to Table 1, for a helical screw of 6 feet (1.8 m) in length, having an outer diameter of 9 inches (23 cm) and a pitch of about 5½ inches (14 cm) (PR 0.61), the highest rate of rotation of the turbine was observed to be about 159 rpm, occurring when the angle α between the longitudinal axis 40 and the direction of the current C was about 31°. The average rate of rotation between the range of about 29° and about 32° was about 158 rpm.

Figure 13D:
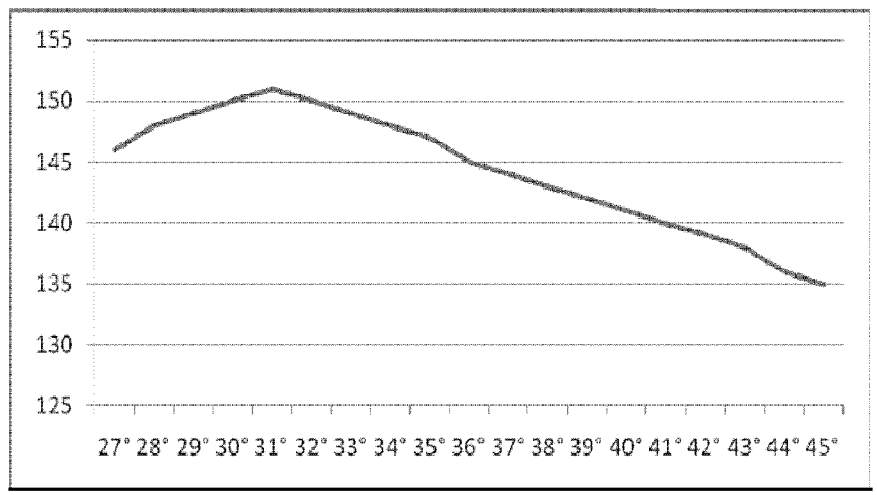

As shown in FIG. 13D and with reference to Table 1, for a helical screw of 6 feet (1.8 m) in length, having an outer diameter of about 9 inches (23 cm) and a pitch of about 6¾ inches (17 cm) (PR 0.75), the highest rate of rotation of the turbine was observed to be about 151, occurring when the angle α between the longitudinal axis 40 and the direction of the current C was about 31°. The average rate of rotation between the range of about 30° and about 32° was about 150 rpm.

Figure 13E:
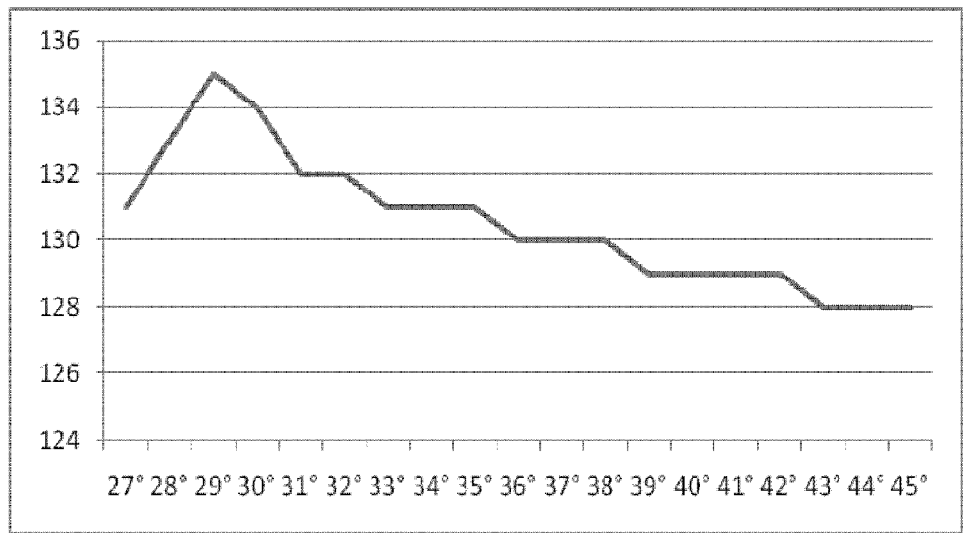

As shown in FIG. 13E and with reference to Table 1, for a helical screw of 6 feet (1.8 m) in length, having an outer diameter of about 9 inches (23 cm) and a pitch of about 8 inches (20.5 cm) (PR 0.89), the highest rate of rotation was observed to be about a sub-optimal 135 rpm, when the angle α between the longitudinal axis 40 and the direction of the current C was about 29°. The average rate of rotation between the range of about 28° and about 30° was about 134 rpm.

With references to Table 1, and FIGS. 13A to 13E, the rate of rotation of a helical turbine, regardless of the pitch, appears to be the greatest in the range of about 29° to about 32°. That is the optimum angle for providing the highest rates of rotation is about 29° to about 32°.

Applicant further believes that given a constant length L of a helical turbine, as one increases the number of turns or twists of the helicoid blade (i.e. decrease the pitch P), the total surface area of the helicoid blade that is exposed to the current increases and thus provides greater efficiency of rotation.

Figure 13F:
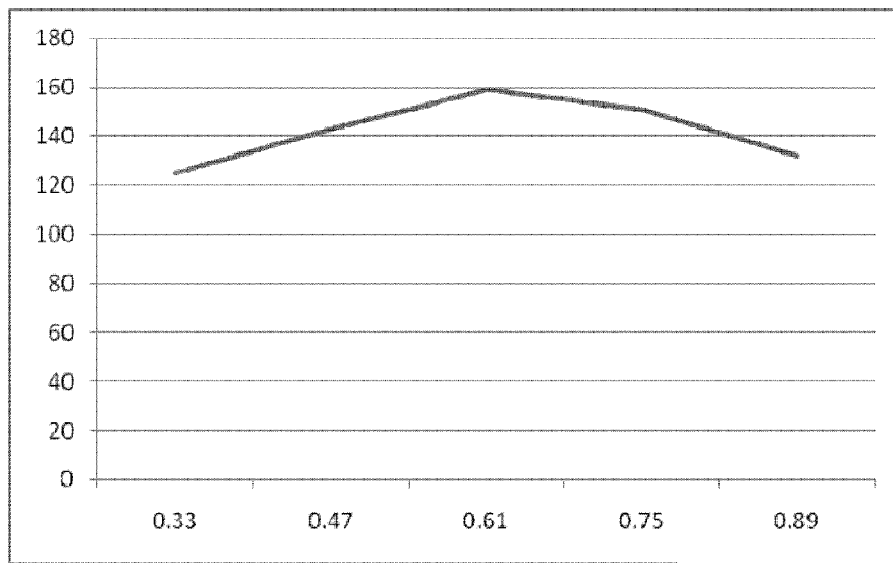
FIG. 13F is a chart illustrating test results for rates of rotation versus various pitch ratios.

FIG. 13F illustrates the rate of rotation of the same five helical turbines as above, placed at a operative angle of about 31°. As shown, the highest rate of rotation was observed to be at about 158 rpm with the helical turbine having a pitch ratio of about 0.6. The rates of rotation were all higher than about 140 rpm for the turbines having a pitch ratio between about 0.5 and about 0.75.

River Embodiment

Figure 3:
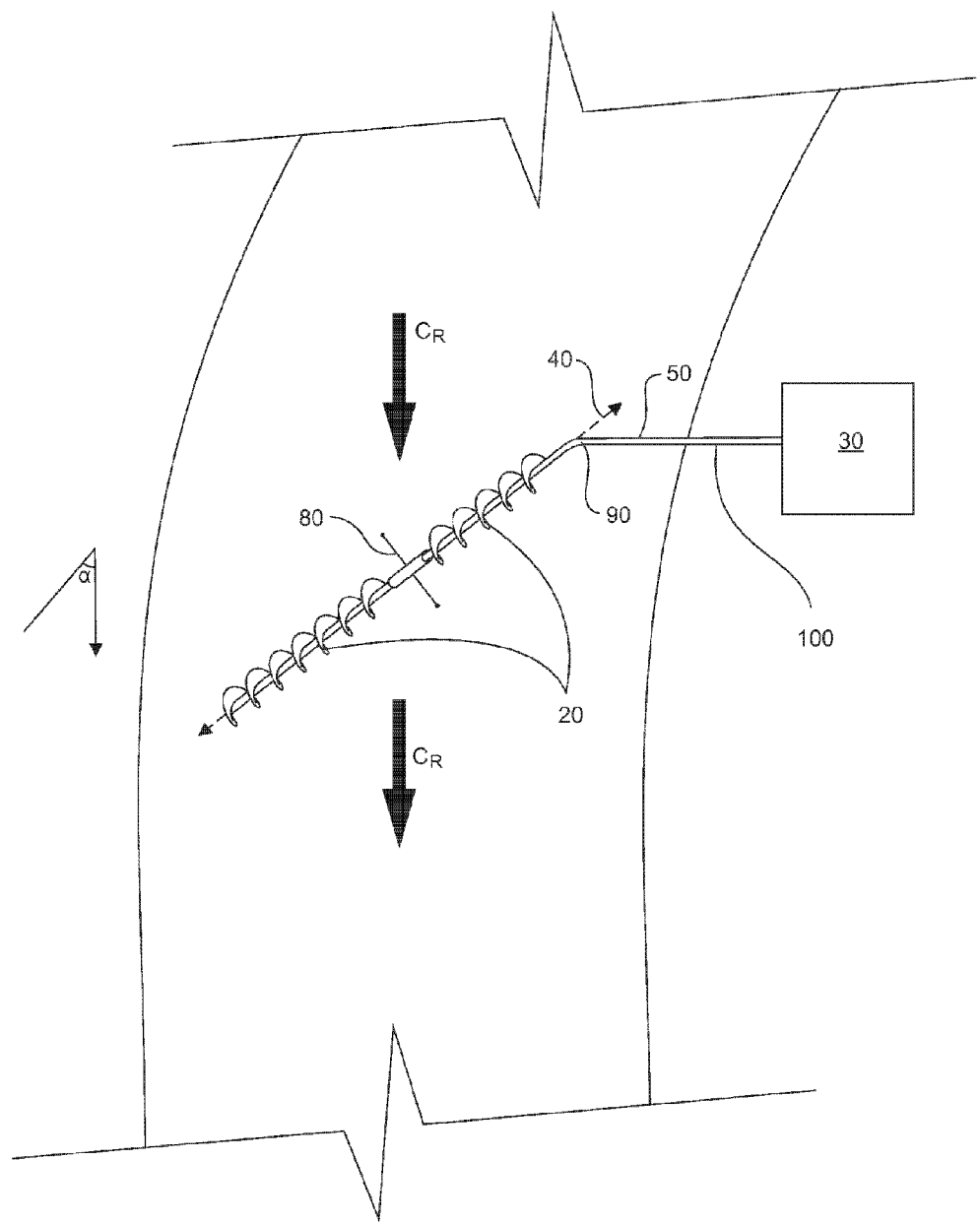
FIG. 3 is a plan schematic representation of an embodiment of the present invention as applied in a river environment, illustrating a helical turbine angularly oriented relative to a direction of the flowing river, the helical turbine being operatively connected to a surface generator by a rotatable shaft.
Figure 4:
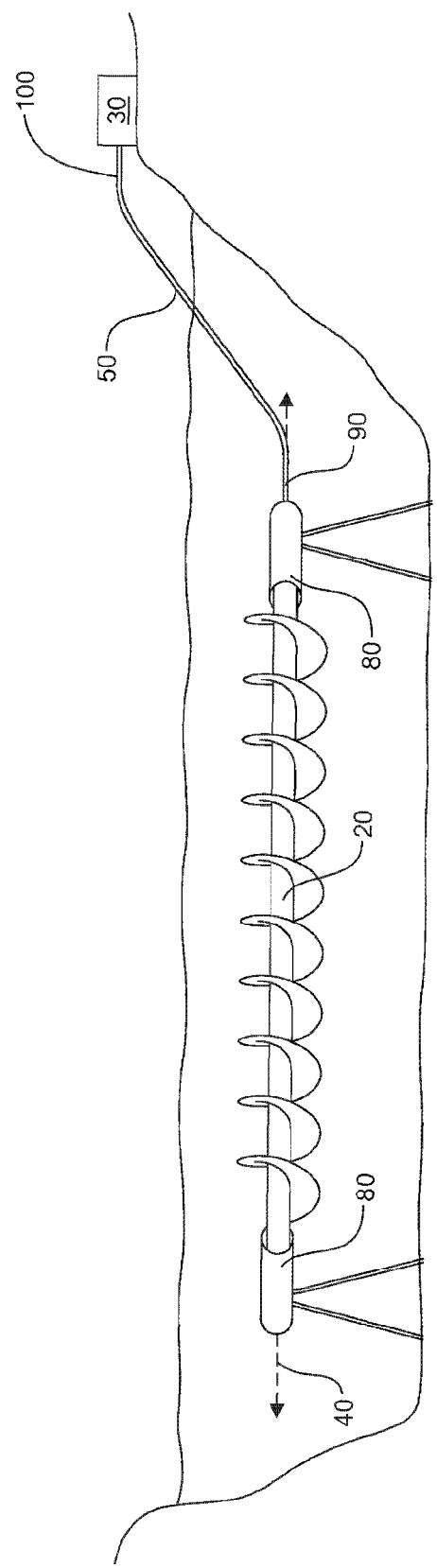
FIG. 4 is a side schematic representation of the embodiment in accordance with FIG. 3, illustrating supports for anchoring the embodiment to the riverbed.

With reference to FIGS. 3 and 4, an embodiment of the present invention for application in a river environment is illustrated. As shown, the helical turbine 20 can have supports 80 for positioning the turbine 20 within a river current $C_R$ and orienting the longitudinal axis 40 of the turbine 20 to be angularly offset relative to the direction of the current $C_R$. The turbine 20 is operatively connected to a first end 90 of the rotatable shaft 50 while a second opposite end 100 of the rotatable shaft is operatively connected to the generator 30 located onshore.

As the direction of the flow of the river is substantially constant at a particular location along the riverbank, the angular orientation of the longitudinal axis 40 will not likely change and thus would not likely require periodic alignment of the turbine 20. Thus, the supports 80 can extend away from the turbine 20 and permanently anchor directly to the riverbed.

Figure 5:
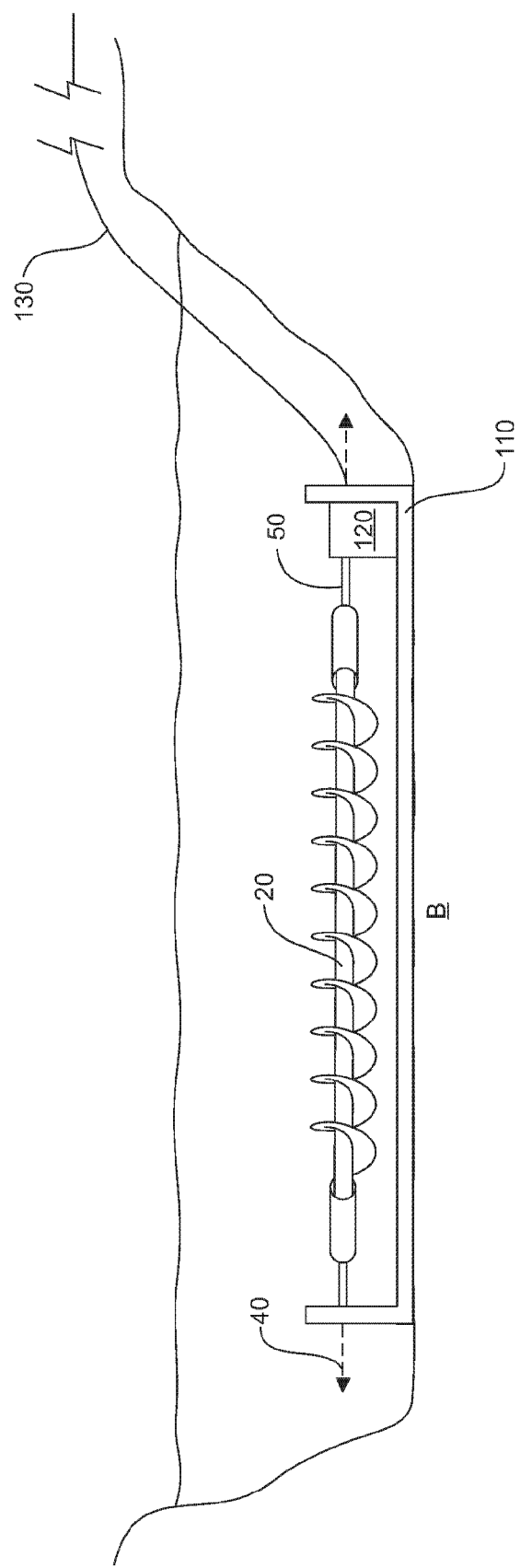
FIG. 5 is a side schematic representation of an embodiment of the present invention as applied to a river environment, illustrating a helical turbine and a submerged generator supported on a frame laying on the riverbed, the embodiment being connected to a power grid by a conventional electric transmission line.

As shown in FIG. 5, and in another embodiment of a river application, the helical turbine 20, rotatable shaft 50 and generator can be supported in a frame 110 which can be positioned to rest on top of the riverbed B. The frame 110 can be oriented to cause the longitudinal axis 40 to be angular oriented relative to the direction of the current $C_R$. A person of ordinary skill in the art would understand that the generator should be a generator capable of being submerged underwater, such as a submerged generator 120. Typical electrical transmission lines 130 can connect the submerged generator 120 to an onshore electrical grid (not shown) and/or other storage facilities or devices (not shown).

Oceanic or Tidal Embodiments

Figure 6A:
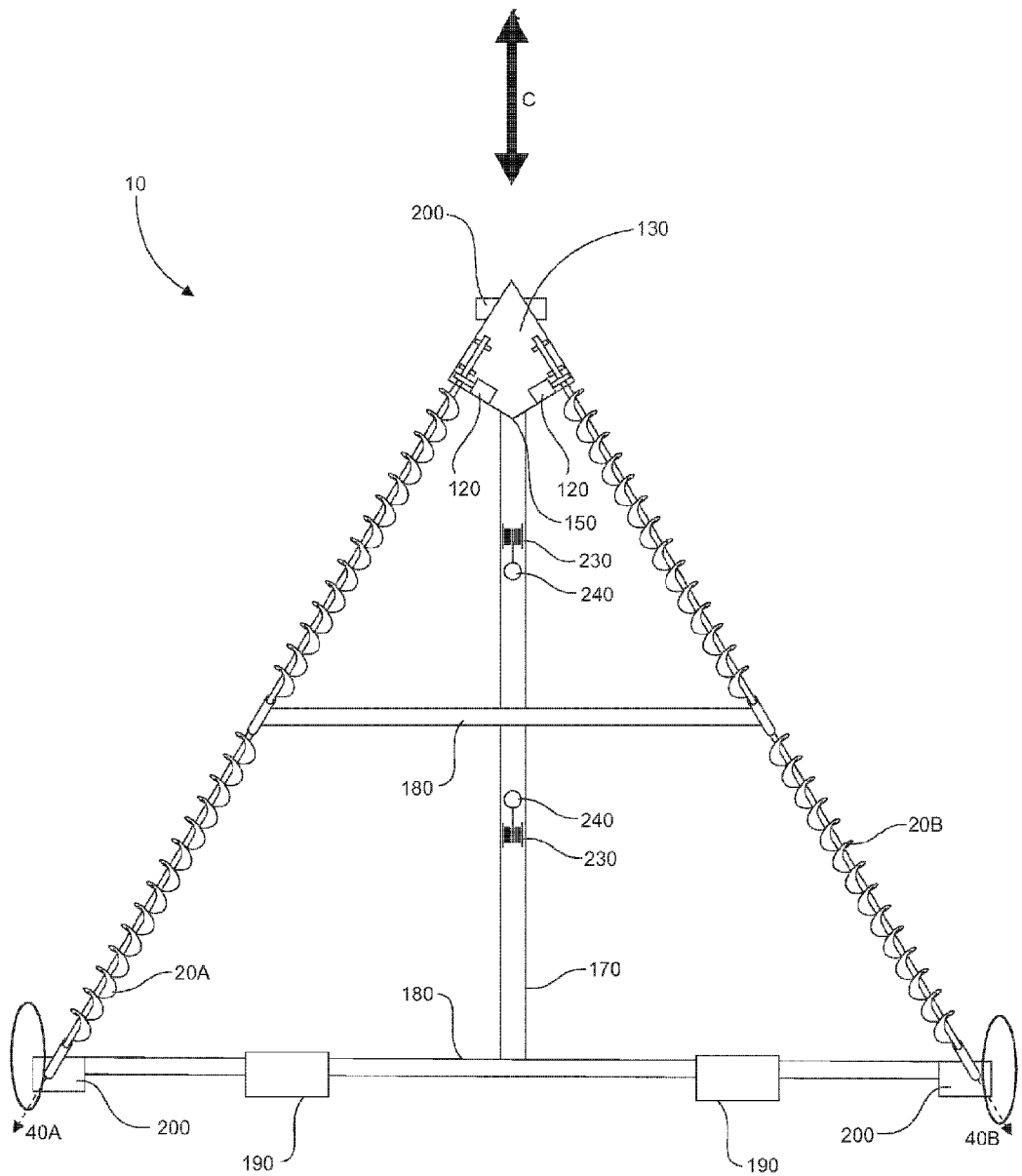
FIG. 6A is a plan schematic representation of an tidal embodiment illustrating a generator housing having a pair of helical turbines extending therefrom, each of the turbines operatively connected to a generator housed within the housing by a rotatable shaft, a keel extending away from the housing and one or more laterally extending stabilization members connecting the two helical turbines to one another at the operative angle.
Figure 7A:
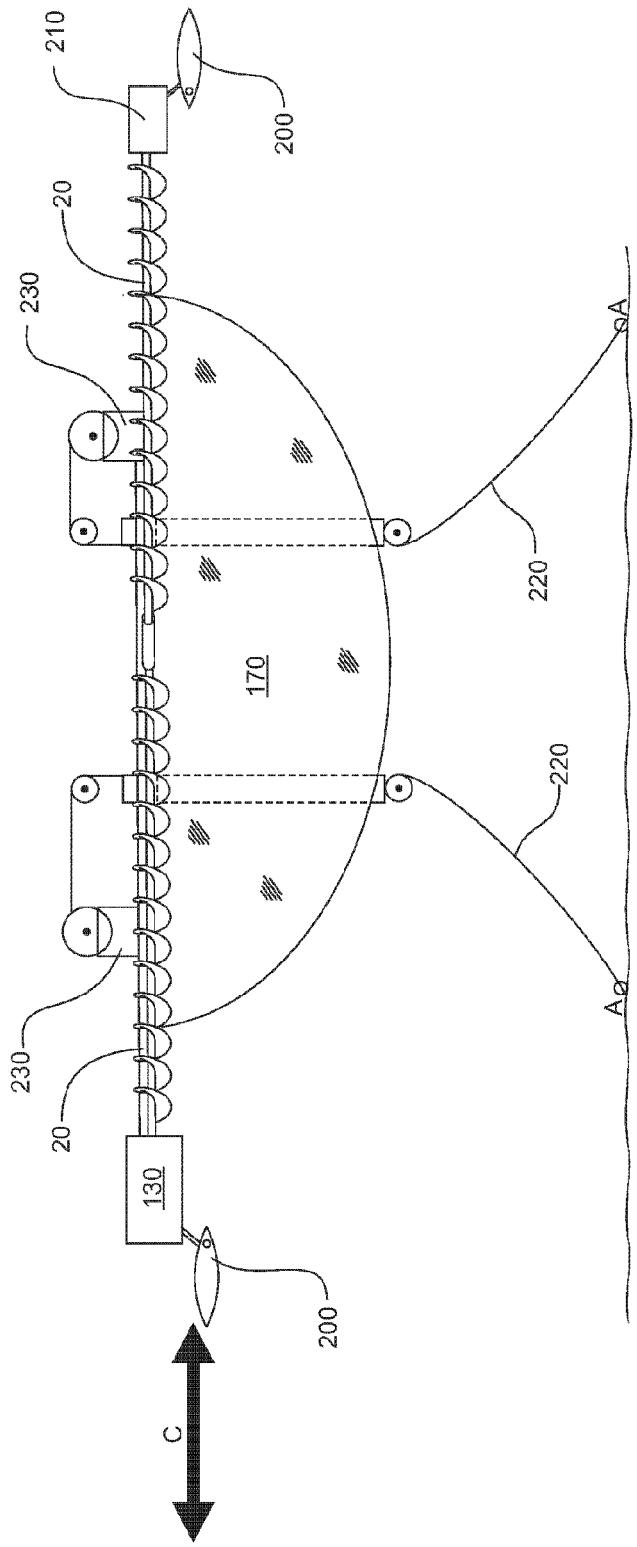
FIG. 7A is a side schematic representative of the embodiment in accordance to FIG. 6A, illustrating two cables running through the keel for anchoring and positioning the system within the current and a hydroplane at opposing ends of the embodiment.

With references to FIGS. 6A and 7A, embodiments of the present invention can be applied in offshore oceanic environments having either uni-directional flow or bi-directional tidal currents, such as coves, inlets and bays along a coastline or oceanic environments having ocean currents, such as the Gulf Stream. As shown, embodiments for applications in oceanic environments are similar to those embodiments in river applications. Embodiments can have first and second helical turbines 20A, 20B operatively connected to at least one generator or a generator 120,120 for each turbine 20,20, namely a first generator 120A and a second generator 120B.

Applicant notes that rotational movement of a single helical turbine 20 about its longitudinal axis 40 will have an associated reactive torque acting on the generator 20 and the structure supporting the generator 120 or generators 120,120, placing a rotating load thereon. Accordingly, embodiments of the invention can comprise a first helical turbine 20A rotatable about its longitudinal axis 40A in a first direction and a second helical turbine 20B rotatable about its longitudinal axis 40B in a second direction opposite the first direction. The opposite rotation of the second helical turbine 20B creates a balancing torque for substantially counteracting the reactive torque of the first helical turbine 20A.

In oceanic embodiments, several factors are considered including the buoyancy of the overall system and means for retaining the system in place. Structure 150 is provided for supporting the at least one helical turbine 20 and maintaining the operative angle between the longitudinal axis 40 and the direction of the current C.

With reference to FIG. 6A, a submerged embodiment of the system 10 can have a two helical turbines 20A,20B arranged in a structure 150 having a V-shape, each positioned within the current C at an operative angle relative to the direction of the current C, the angle being the angle between the longitudinal axis 40A,40B and the direction of the current. Each of the two helical turbines is operatively connected to a submerged generator 120 supported within a generator housing 130. Submerged generators apply appropriate water lubricated seal technology as known to skilled marine technicians. The structure 150 comprises the helical turbines 20a, 20b converging at the generators housing 130 and one of more horizontal stabilizing members 180 extending between the helical turbines 20A, 20B. Buoyancy is provided at the generator housing 130 and like balancing buoyancy elsewhere in the structure 150, or at or adjacent distal ends of the helical turbines 20A,20B. A positive buoyancy is provided so that the system 10 floats to surface of the body of water if not anchored.

Control surfaces are provided for engaging the current C and maintaining the structure 150 and at least one helical turbine 20 oriented in the current for maintaining the operative angle. The control surfaces can include one or more of keels, elevators and ailerons. The control surface are disposed for maintaining the operative angle between the longitudinal axis 40,40 and the direction of the current C, and the depths of the system 10 in the body of water C. The control surfaces can be supported from the structure 150 such adjacent the generator housing 130, the stabilizing members 180, or disposed along the helical turbines 20A,20B. Note that the stabilizing members 180 and control surfaces, as appropriate, enable rotation of the turbines relative thereto, such as through bearing collars or the like.

As shown in FIGS. 6A and 7A, one control surface for maintaining the operative angle between the longitudinal axis 40,40 and the direction of the current, is a rudder or keel 170. The keel 170, equidistance between the two helical turbines 20A,20B, extends away from the generator housing 130 and is positioned at a the fixed operative angle relative to the longitudinal axis 40,40 of the turbines 20A,20B. The keel 170 can extend partially or fully along and between the helical turbines.

Figure 6B:
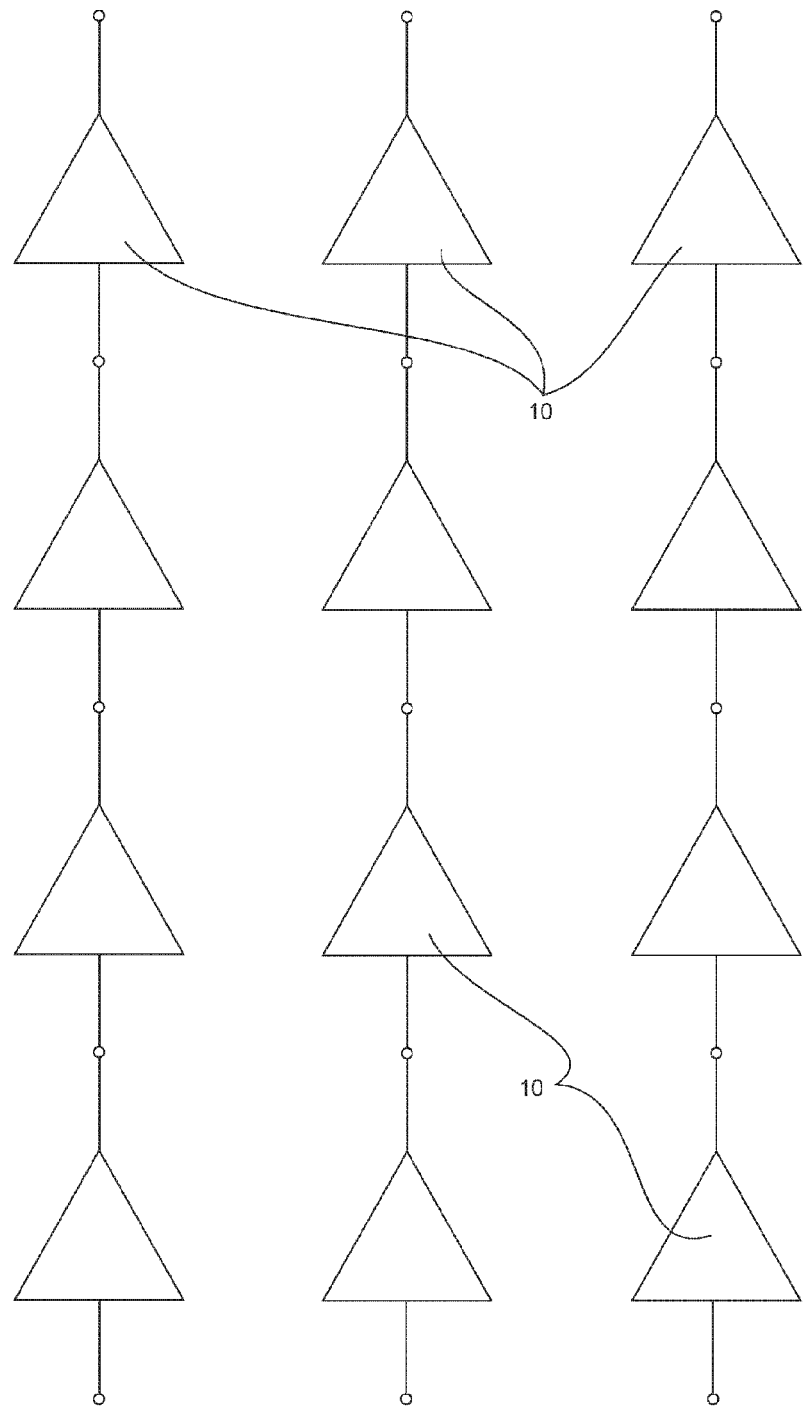
FIG. 6B is a plan schematic view of a farm or array of the paired turbine tidal embodiment of FIG. 6A.

The system 10 can be anchored or tethered to the ocean floor by at least one cable 220. As shown, a pair of anchor lines such as cables 220,220 are each attached to the floor of the body of water using two anchoring devices at anchor points A,A. With reference to FIG. 6B, a farm or array of systems 10,10 . . . can be provided, sharing anchors points A as convenient. The cables 220,220 extend from about a base of the keel, anchoring and stabilizing the system 10. The keel can be weighted along a base thereof for additional stability.

For raising and lowering the system 10, the cables 220,220 are attached to respective winches 230,230 supported on a top side of the keel 170. The cables can extend through conduits 240,240 through or adjacent the keel 170. The winches 230, 230 increase or decrease the length of the cables 220,220 for permitting the system 10 to rise for retrieval or maintenance at surface or to lower or sink within a body of water for operations. The cable openings or conduits 240,240, and respective anchoring lines 220,220, are spaced apart longitudinally along the keel 170.

As the current C flows or passes by the keel 170, the keel 170 is maintained in alignment with the current C. Accordingly, as the keel 170 is positioned in a fixed relation to the longitudinal axis 40,40, the longitudinal axis 40,40 are also maintained at an angle relative to the direction of the current C. In an embodiment, the fixed angle between the keel 170 and the longitudinal axis 40,40 of the turbines 20,20 is substantially the same as the angle between the longitudinal axis and the direction of the current C.

In FIGS. 6A and 7A and further control surfaces such as hydroplanes or elevators assist in maintain the structure 150 in a substantially horizontal plane. In tidal embodiments, in this the current C flow alternates its direction, elevators 200 are provided fore and aft of the keel 170. As shown, elevators 200 can be controlled or passively pivoted to provide respective and alternating bow and stern behavior, a bow elevator tipping up to prevent diving and the stern elevator leveling out. In embodiments, elevators 200 can be supported on or about the generator housing 130 and at a distal end 210,210 of each of the two helical turbines 20A,20B for further controlling any potential diving movement of the system 10.

Figure 7C:
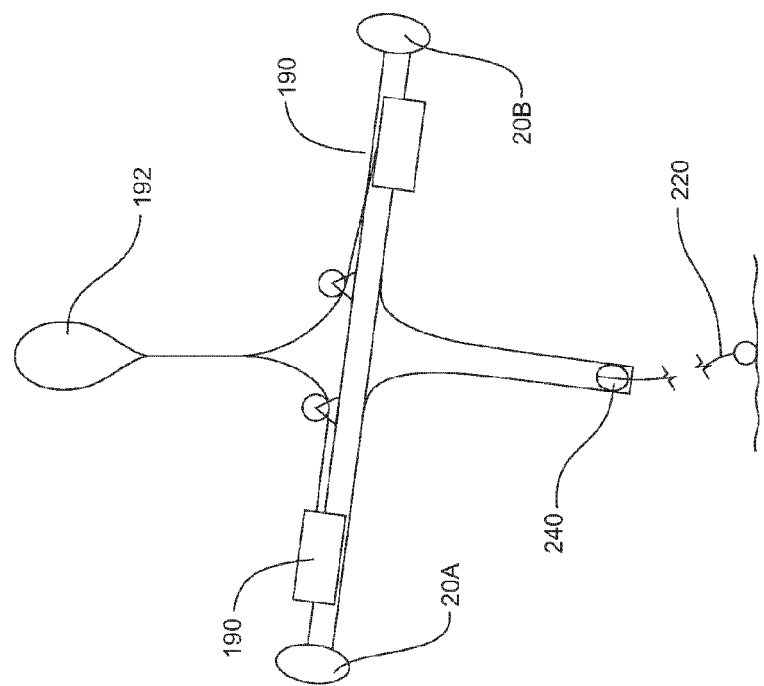
FIGS. 7B and 7C are end view of implementations of ailerons on the tidal structure of FIG. 7A having a vertical sensor for maintaining the structure in a horizontal plane (FIG. 7B) and reacting to correct variance from the horizontal plane (FIG. 7C)
Figure 7B:
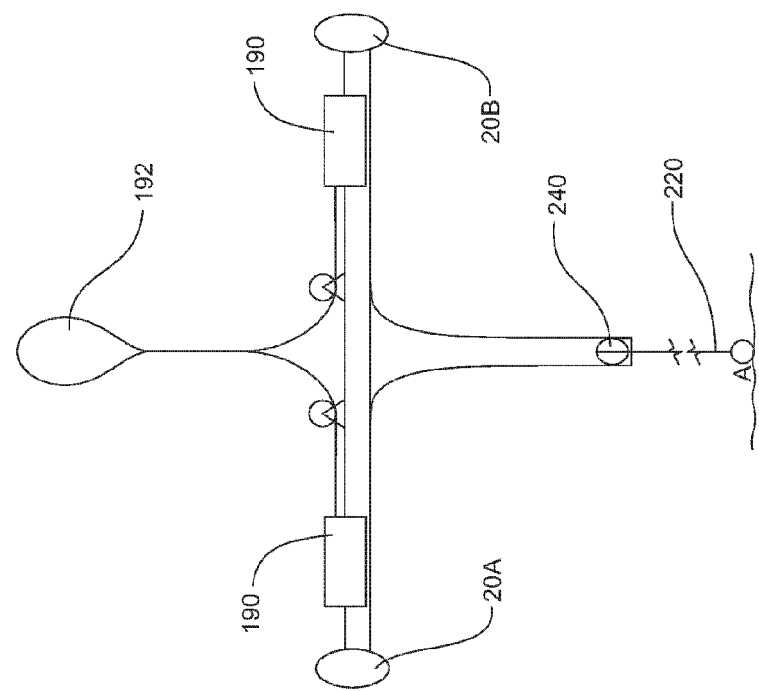

With reference to FIGS. 7B and 7C, further control surfaces can control roll, comprising at least two ailerons 190, 190 which can be fit to the structure, such as at the stabilizing members 180 extending between the two helical turbines 20,20. The ailerons 190,190 are oppositely actuable to engage the current maintaining the system 10 in a substantially consistent horizontal plane. A simple system, as shown schematically in FIG. 7B illustrates a buoyancy device such as balloon 192. Rolling action of the system 10 results in a counteracting manipulation of the ailerons (shown in an exaggerated movement) in FIG. 7C.

Unidirectional Current

Figure 8:
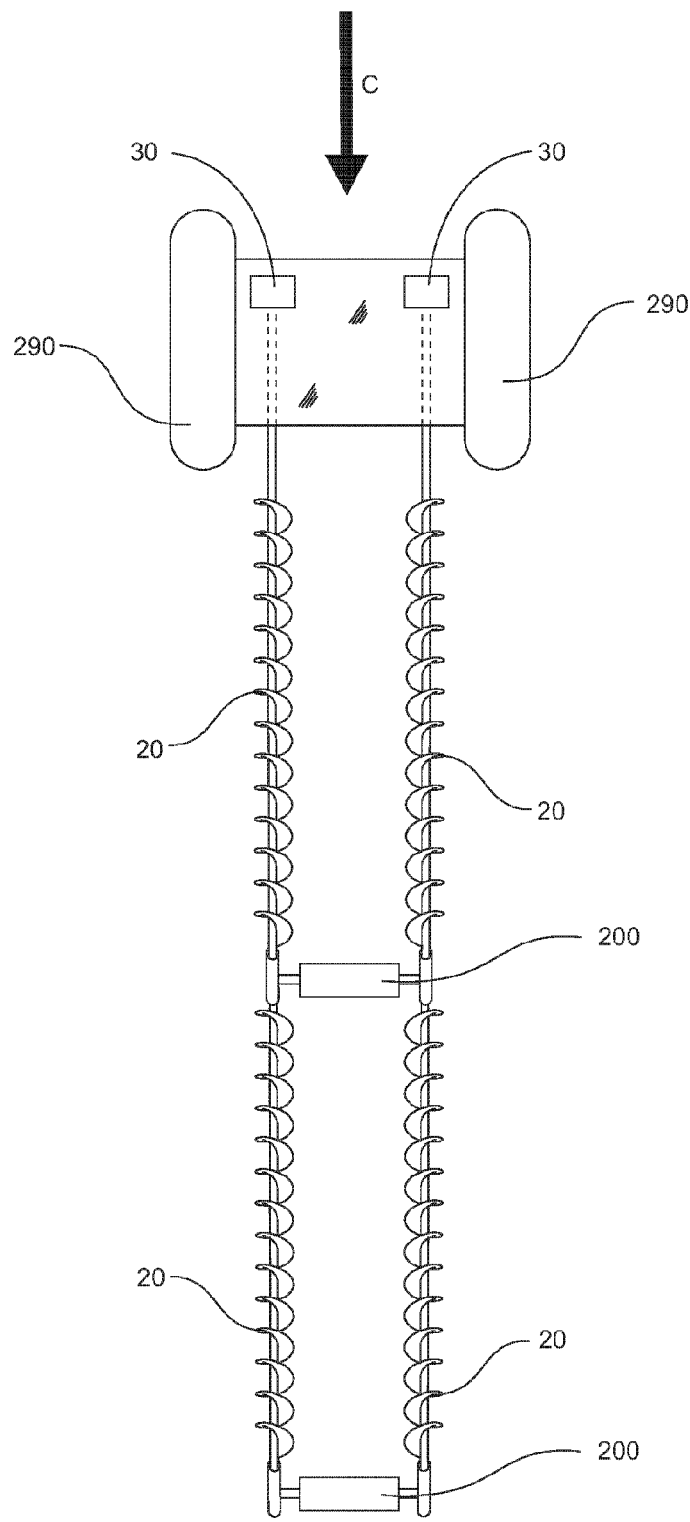
FIG. 8 is a plan schematic representation of an embodiment of the present invention as applied in an oceanic environment, illustrating a floating barge having two pontoons for supporting two helical turbines, each of the helical turbines operatively connected to a generator by a rotatable shaft, and a hydroplane extending between the two helical turbines.
Figure 9:
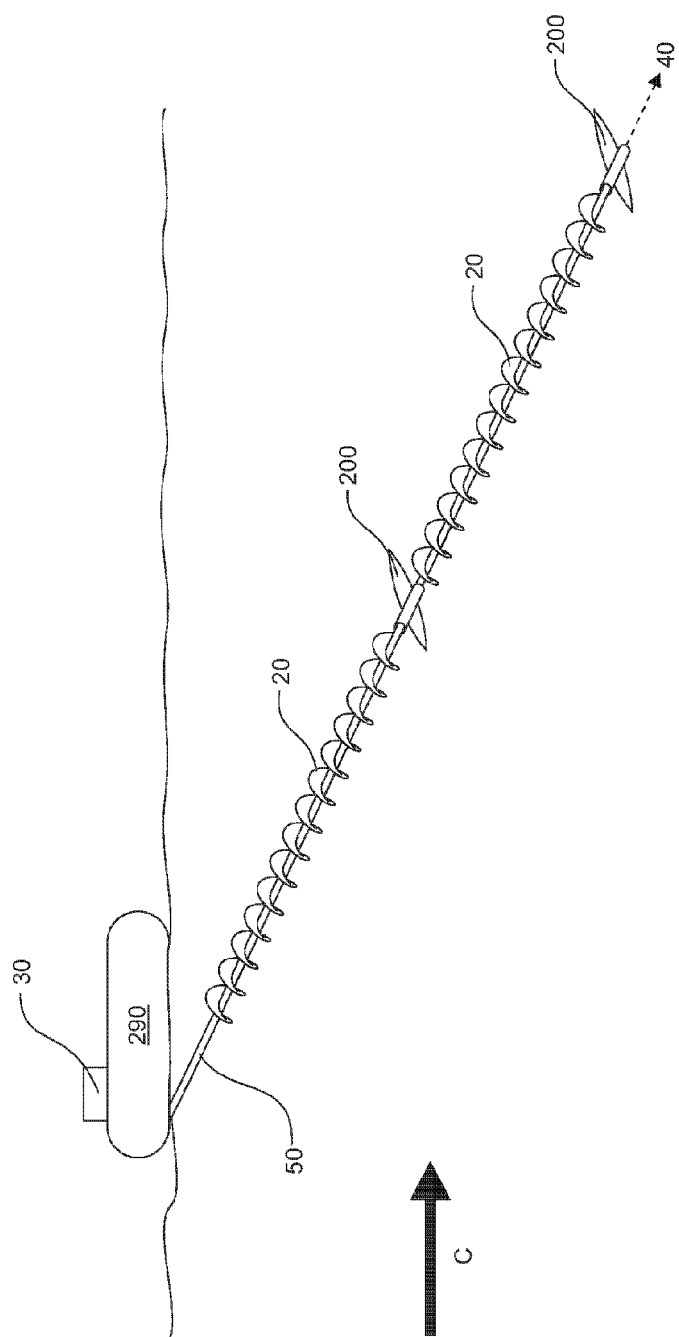
FIG. 9 is a side schematic representation of the embodiment in accordance to FIG. 8.

With reference to FIGS. 8 and 9, a floating embodiment of the system 10 as applied to oceanic environments can include at least one helical turbine 20 supported on a floating platform, barge or pontoons 290 floating on a surface of a body of water. The pontoons 290 can support at least one generator above the surface of the body of water and support the at least one helical turbine below the surface of the water.

The helical turbines of opposing turns can be provided in pairs 20A,20B, again aiding in countering reactive torque. While a pair is shown, a plurality of helical turbines 20, 20 . . . can be provided along an extended structure such as a barge or structure between floating platforms.

The pontoons 290 of the floating platform are positioned above a flowing oceanic current for placing the at least one helical turbine within the current. The floating platform is typically at anchor providing structure for orienting the helical turbines inline with the current C. As shown, a pair of generators 30,30 and a pair of helical turbines 20,20 are supported at or above the surface of the body of water, the helical turbines 20,20 being parallel to one another and angled downwardly from the floating platform and into the current at the operative angle. One of more elevators 200,200 can be disposed along the two parallel helical turbines 20,20. The elevators 200 counteract the lifting reaction of the current on the helical turbines 20,20. Further, the elevators 200 can also extend between the turbines 20,20 as part of the system structure and maintain the parallel relationship therebetween. The elevator 200 may be passive or actuatable for maintaining the operative angle of the longitudinal axis 40,40 of the helical turbines 20,20 and the direction of the current C.

Figure 10:
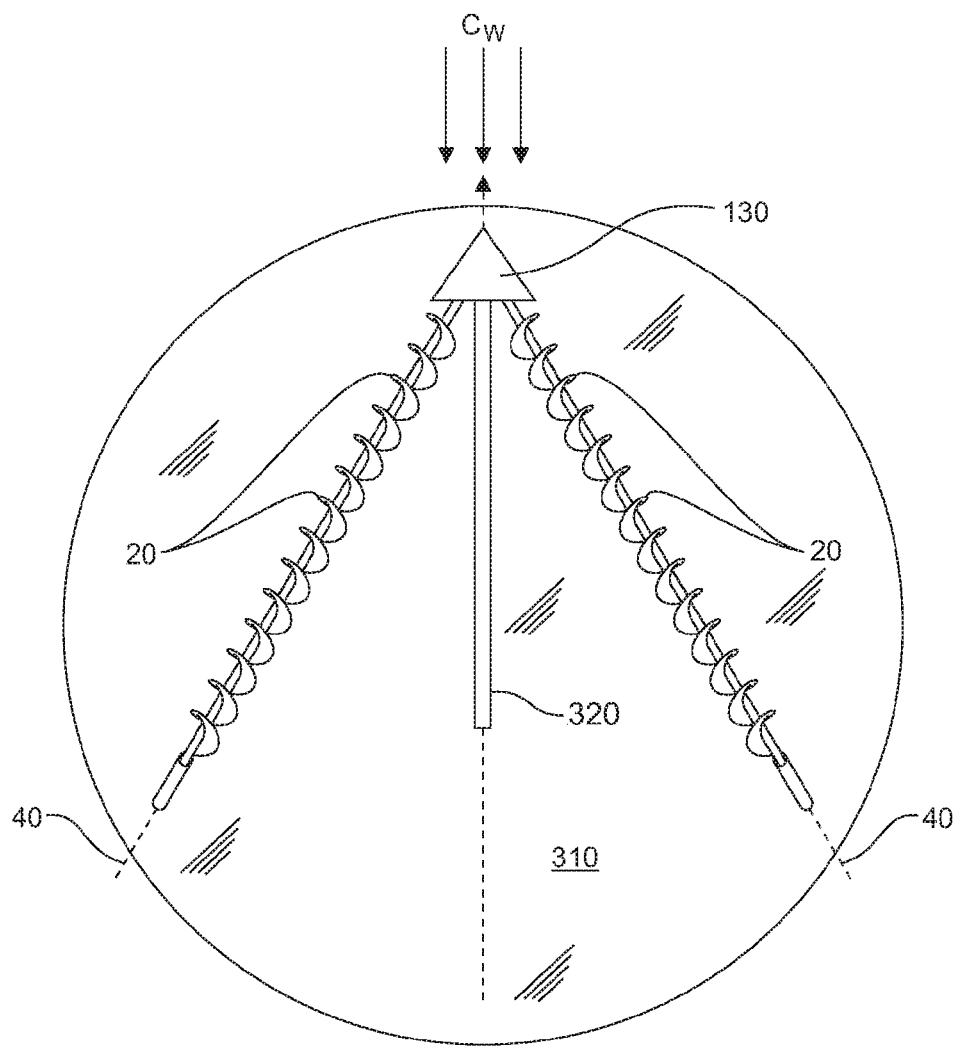
FIG. 10 is plan schematic representation of an embodiment of the present invention as applied in a wind environment, illustrating a rotatable base for supporting at least two helical turbines operatively connected to at least one generator housed within a generator housing and a rudder.

With references to FIGS. 10 and 11, an embodiment of the invention for application in a wind environment is illustrated. The system 10 includes a structure having a freely rotatably base 310 for supporting at least one helical turbine 20, the generator in housing 130 and controlling the at least one helical turbine within a wind $C_W$.

As shown, two helical turbines 20,20 arranged in a V-shape are supported by rigid supports 80 for elevating the two helical turbines 20,20 to a height sufficient above the rotatable base 310 to place the turbines 20,20 within the air stream or wind $C_W$. The helical turbines 20,20 are symmetrically arranged at the operative angle relative to the direction of the wind $C_W$. The V-shape, having a narrow leading edge, and freely rotatable base is expected to be self orienting. Optionally a rudder 320 is supported on the base 310 and is positioned at a fixed angle relative to the longitudinal axis 40,40 of the turbines 20,20. As the wind $C_W$ blows upon the V-shape, or rudder 320, the system 10 is maintained in alignment with the wind $C_W$. Accordingly, as the rudder 320 is positioned in a fixed relation to the longitudinal axis 40,40, the longitudinal axis 40,40 are also maintained at an operative angle relative to the direction of the wind $C_W$.

Figure 12A:
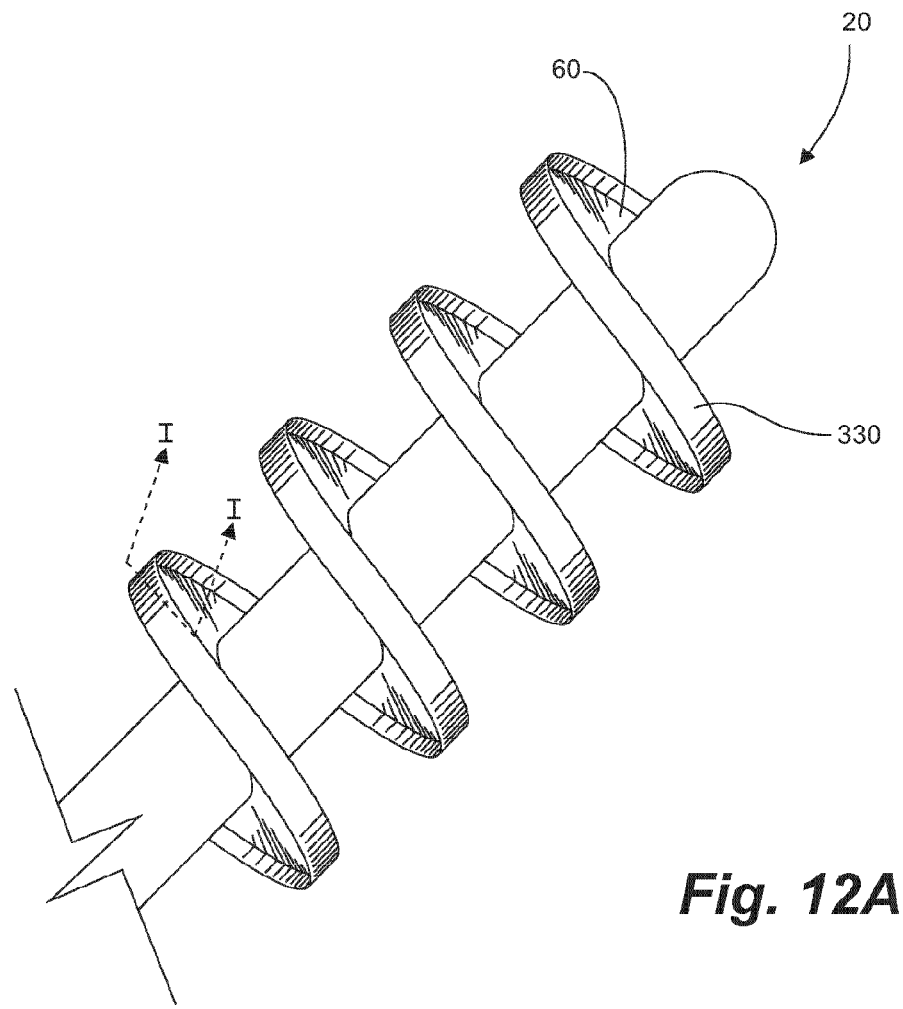
FIG. 12A is a perspective schematic representation of a helicoid blade having outer edges.
Figure 12B:
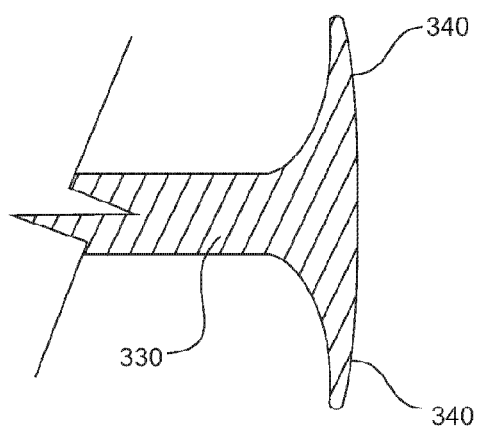
FIG. 12B is a cross-sectional view, along the lines I-I, of the outer edge of the helicoid blade having arcuate winglets in accordance with FIG. 12A.

In an embodiment and with reference to FIGS. 12A and 12B, in an embodiment, the helicoid blade 60 can have an outer edge 330 with at least one arcuate winglets 340, similar to that of an upstanding, drag-reducing winglets at the tip of current airplane wing technology. Applicant believes that the arcuate winglet 340 increases the effectiveness of the helicoid blade, increasing the rate of rotation of the helical turbine 20. In an embodiment applied to oceanic environments having bi-directional tidal currents, the outer edge 330 of the helicoid blade 60 can have two arcuate winglets 340,340 extending in opposing directions.

Embodiments of the invention can also have buoyancy means for achieving or changing a buoyancy of the system sufficient to the maintain the system at an appropriate depth, safe from surface weather and optimized for positioning the system at a depth for a particular current. Buoyancy means can be of any type known in the industry, including buoyancy bladders and/or hydroplanes.

We claim:

1. A system for converting kinetic energy from a body of fluid, having a current flowing in a direction, into rotational movement comprising:
    at least one helical turbine in the current and rotatable about a longitudinal axis;
    at least one rotatable shaft operatively connected to the at least one helical turbine for transferring rotation of the at least one helical turbine into rotational movement of the at least one rotatable shaft; and
    a structure for supporting the at least one helical turbine and maintaining an operative angle between the longitudinal axis and the direction of the current in the range of 30° to 39°.

2. The system of claim 1, wherein transferring rotation of the at least one helical turbine into rotational movement further comprises converting the rotational movement into electrical power, and wherein the at least one helical turbine comprises one or more pairs of helical turbines each pair having:
    a first helical turbine supported by the structure and rotatable about its longitudinal axis in a first direction; and
    a second helical turbine supported by the structure and rotatable about its longitudinal axis in a second direction opposite the first direction.

3. The system of claim 1 further comprising control surfaces for engaging the current and maintaining the structure and the at least one helical turbine oriented in the current for maintaining the operative angle.

4. The system of claim 2 wherein the first and second helical turbines are horizontal and angled laterally at the operative angle, from the structure, arranged in a V-shape.

5. The system of claim 4 wherein the body of fluid is water and the structure is buoyant.

6. The system of claim 5 further comprising a keel supported from the structure for substantially aligning the structure with the direction of the current for maintaining the first and second helical turbines at the operative angle.

7. The system of claim 6 further comprising two anchoring lines extending from and spaced apart longitudinally along a base of the keel.

8. The system of claim 7 wherein each anchoring device comprises:
    an anchor and anchor lines extending from the anchor to the keel;
    an anchor line conduit along the keel to the structure; and
    a winch to dispense the anchor line to enable the buoyant structure to rise to a surface of the body of water and to rewind the anchor line for lowering the buoyant structure into the current.

9. The system of claim 5 further comprising an elevator for engaging the current and maintaining the first and second helical turbines along a substantially horizontal plane within the current.

10. The system of claim 9 further comprising ailerons for engaging the current and maintaining the first and second helical turbines along the substantially horizontal plane within the current.

11. The system of claim 5 wherein the structure further comprises control surfaces for engaging the current and maintaining the structure and the at least one helical turbine oriented in the current for maintaining the operative angle, the control surfaces further comprising:
    a keel supported from the structure for substantially aligning the structure with the direction of the current for maintaining the first and second helical turbines at the operative angle;

two anchoring devices extending from and spaced apart along the base of the keel, each anchoring device comprising an anchor and anchor lines extending from the anchor to the keel, an anchor line conduit along the keel to the structure and a winch to dispense the anchor line to enable the buoyant structure to rise to a surface of the body of water and to rewind the anchor line for drawing the buoyant structure down into the current;

elevators fore and aft for engaging the current and maintaining the first and second helical turbines along a substantially horizontal plane within the current; and ailerons for engaging the current and maintaining the first and second helical turbines along the substantially horizontal plane within the current.

12. The system of claim 2, wherein the first helical turbine is operatively connected to a first generator of the at least one generator;

the second helical turbine is operatively connected to a second generator of the at least one generator; and wherein the first and second generators are supported by the structure and reactive torque by the first helical turbine is counteracted by reactive torque generated by the second helical turbine.

13. The system of claim 1 further comprising a floating platform for supporting the at least one generator above a surface of the body of fluid and wherein the at least one helical turbine is angled downwardly from the floating platform and into the current at the operative angle.

14. The system of claim 13 wherein the at least one helical turbine comprises one or more pairs of helical turbines each pair having:

a first helical turbine supported by the structure and rotatable about its longitudinal axis in a first direction and operatively connected to a first generator of the at least one generator; and a second helical turbine supported by the structure and rotatable about its longitudinal axis in a direction opposite the first direction the second helical turbine and operatively connected to a second generator of the at least one generator.

15. The system of claim 14 further comprising one or more elevators disposed along the first and second helical turbines for engaging the current and maintaining the first and second helical turbines along the operative angle.

16. The system of claim 1, wherein the at least one generator is a generator for each of the at least one helical turbine.

17. The system of claim 1, wherein the at least one helical turbine further comprises at least one helicoid blade extending along a length thereof and having a pitch ratio in between the range of 0.30 to 0.9.

18. The system of claim 17 wherein the at least one helical turbine further comprises at least one helicoid blade extending along a length thereof and having a pitch ratio in the range of 0.5 to 0.75.

19. The system of claim 18, wherein the at least one helicoid blade further comprises an outer edge having at least one arcuate winglet therealong.

20. The system of claim 1, wherein the operative angle between the longitudinal axis and the direction of the current is in between the range of 30° to 34°.

21. The system of claim 20, wherein the operative angle between the longitudinal axis and the direction of the current is in between the range of 30° to 32°.

22. The system of claim 21, wherein the operative angle between the longitudinal axis and the direction of the current is 31°.

23. The system of claim 18 wherein the helicoid blade further comprises a pitch ratio of 0.6.

* * * * *